Figure 1:
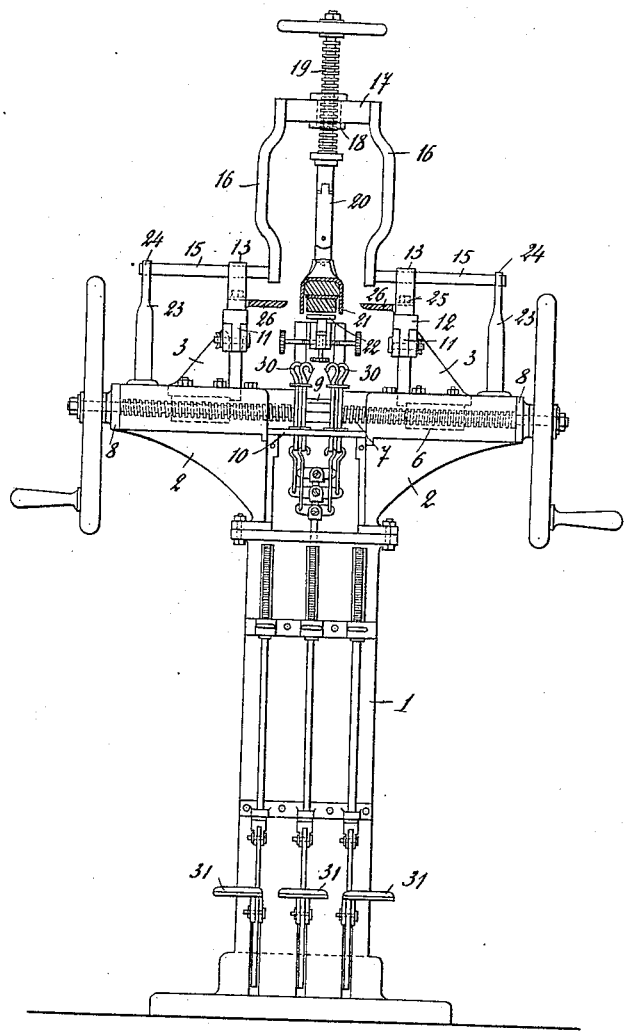

No. 816,587. PATENTED APR. 3, 1906.
C. VAN MARCKE DE LUMMEN.
LASTING MACHINE.
APPLICATION FILED NOV. 19, 1901.

4 SHEETS—SHEET 1.

WITNESSES:
INVENTOR
ATTORNEYS.

No. 816,587. PATENTED APR. 3, 1906.
C. VAN MARCKE DE LUMMEN.
LASTING MACHINE.
APPLICATION FILED NOV. 19, 1901.

4 SHEETS—SHEET 2.

WITNESSES:
Isabella Waldron
Adelaide Claire Gleason

INVENTOR.
Clementinan Marckede Lummen
BY
Richardson
ATTORNEYS.

No. 816,587. PATENTED APR. 3, 1906.
C. VAN MARCKE DE LUMMEN.
LASTING MACHINE.
APPLICATION FILED NOV. 19, 1901.

4 SHEETS—SHEET 3.

WITNESSES

INVENTOR
C. van Marcke de Lummen

ATTORNEYS

No. 816,587. PATENTED APR. 3, 1906.
C. VAN MARCKE DE LUMMEN.
LASTING MACHINE.
APPLICATION FILED NOV. 19, 1901.
4 SHEETS—SHEET 4.
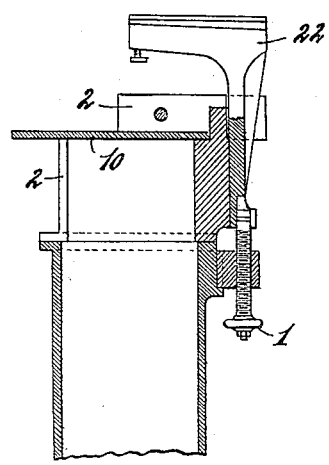
Fig. 4.
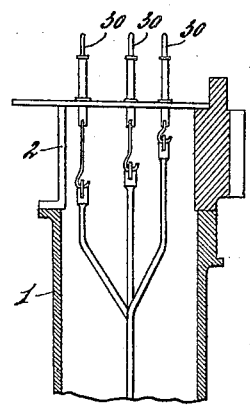
Fig. 6.
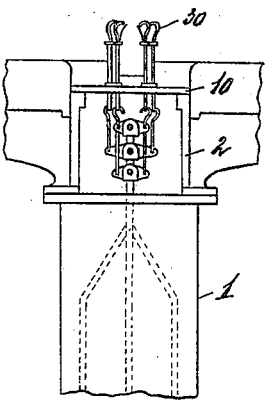
Fig. 7.
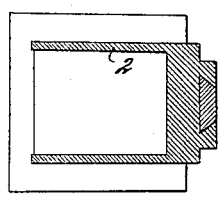
Fig. 5.
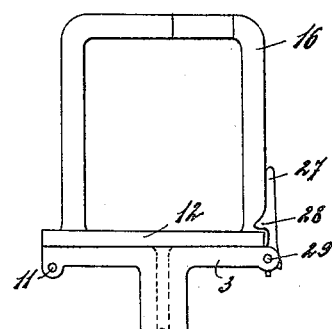
Fig. 8.

UNITED STATES PATENT OFFICE.

CLEMENT VAN MARCKE DE LUMMEN, OF BRUSSELS, BELGIUM.

LASTING-MACHINE.

No. 816,587.  Specification of Letters Patent.  Patented April 3, 1906.

Application filed November 19, 1901. Serial No. 82,899.

*To all whom it may concern:*

Be it known that I, CLEMENT VAN MARCKE DE LUMMEN, manufacturer, a subject of the King of Belgium, residing at Avenue du Roi 32, Brussels, in the Kingdom of Belgium, have invented certain new and useful Improvements in Lasting-Machines, of which the following is a specification.

This invention relates to machines for lasting boots and shoes, in which the upper is stretched on the last by a downward pull upon the upper, the operator at all times being able to inspect the fixing operation. These machines, while allowing of the operation of fixing the upper on the last being performed under the best conditions, are inconvenient from the point of view of the preliminary fixing of the upper to the insole, which is done either by cementing the parts together (an operation which is somewhat difficult to carry out) or by means of tacks or sprigs, which have to be put in position by complicated arrangements uncertain in their operation and difficult to inspect, owing to the upper being mounted on the last in an inverse position to that of an upper lasted by hand and whereby the lower part of the insole is rendered inaccessible. With a view to remedying these defects this invention provides means, in a lasting-machine of the kind above referred to, of allowing the preliminary fixing of the upper and the insole by means of tacks driven into the insole and the upper in the ordinary manner—that is to say, in the same manner as when working by hand. To this end an arrangement is provided for effecting the turning of the last with the upper and the insole after the upper has been stretched on the last and before it has been connected to the insole in such a manner that the lasted upper takes the ordinary position as when working by hand, (sole uppermost.) The upper when released from the stretching appliances is held in tension until just after the preliminary fixing has been effected, which under these conditions can be done by means of tacks in the ordinary well-known manner, as when working by hand. For the purpose of obtaining this novel result my invention is characterized, essentially, in that the parts which serve to bring the upper into contact with the insole after the stretching of the upper form, with the fixing device of the last on the last-support, a rigid whole hinged on one of the sides or one of the faces of the machine, so that in its turned-down position the last, having left the fixed last-support, will be held with the insole and the stretched upper between the fixing device of the last and the parts which serve to bring the upper into contact with the insole, and which parts thereupon in some sort play the part of last-support, at the same time allowing the lower part of the insole to be perfectly free and accessible for putting the tacks in position.

In order to enable the invention to be fully understood, I will describe the same by reference to the accompanying drawings, which show the application of my invention to a machine of a known type having stretching-nippers and pressure-plates adapted to the contour of the boot and serving to apply the stretched upper against the insole.

Figure 2:
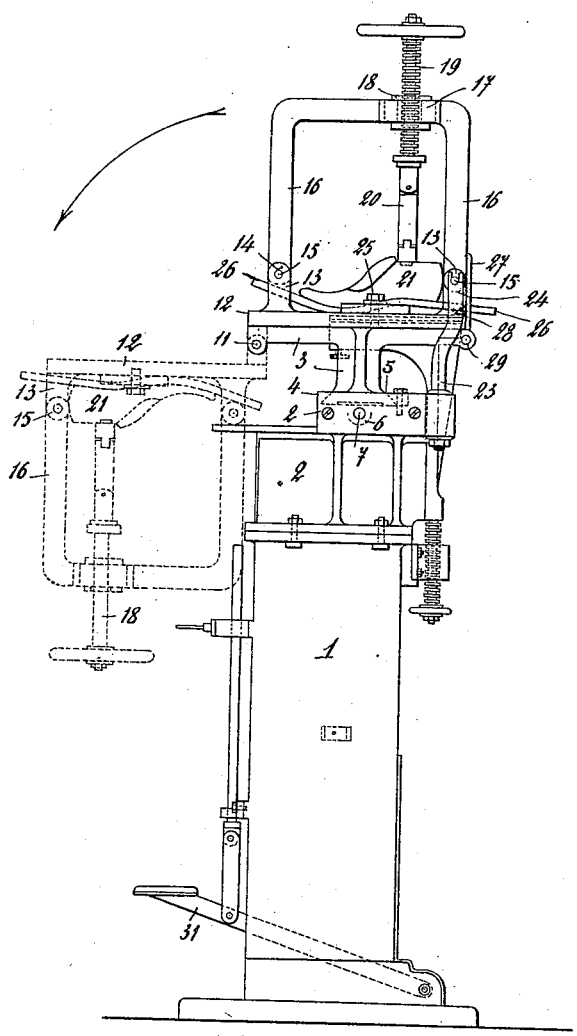
Figure 3:
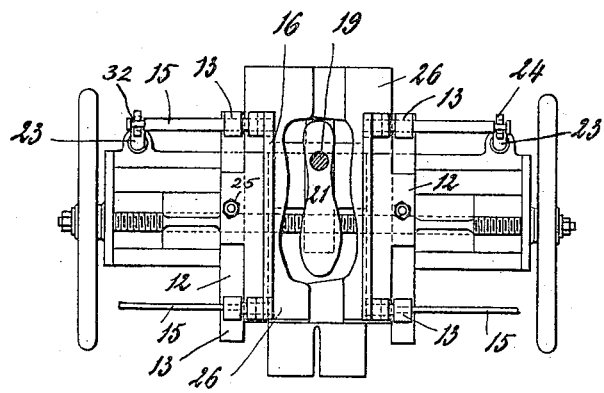
Figure 3:

In the drawings, Figure 1 is a front elevation showing parts in section, and Fig. 2 is a side view of the machine. Fig. 3 is a top view of the machine. Fig. 4 is a vertical section through the frame 2 and shows the manner of supporting the last-support 22. Fig. 5 is a horizontal section through the same frame 2. Fig. 6 is a vertical section through the frame 2 similar to Fig. 4, but showing more particularly the way of connecting the treadle-links with the hooks 30. Fig. 7 is a front view corresponding to Fig. 6. Fig. 8 is a separate view showing more clearly the latch 27-28.

The machine comprises an ordinary upright carrying a head 2, serving as a guide for supports 3, sliding in a dovetail groove formed by an edge of the head 2 and by a bar-guide 5 on this head. The supports 3 are each provided with a screw-threaded sleeve 6, the threads being, respectively, of right and left hands. In these sleeves 6 works a screw 7, the threads of which correspond with those of the sleeves 6, the said screw 7 turning freely in fixed bearings 8, carried by the head 2, and in a bracket or block 9, fixed on a plate 10 at the center of the head 2.

According to my invention the supports 3 instead of carrying directly, as in all machines of this class with which I am acquainted, the pressure-plates for bringing the upper into contact with the insole are provided, each at one end, with a hinge 11, the movable part of which is formed integral with a cross-piece 12, adapted to lie upon the upper horizontal face of the support 3. Each of these cross-pieces 12 has two vertical arms 13, provided with an eye 14, through which passes a rod 15. These rods 15, to the number of four, carry the fixing device for the last, comprising a four-armed stirrup 16, the upper cross-bar 17 of which serves to receive a nut 18, through which works a screw-threaded rod 19, to which is connected a jointed rod 20, serving to fix the last 21 on a suitable last-support 22. The head 2 carries at its rear part two vertical supports 23, provided with forks 24, in which rest the ends of the rear bars 15 when the stirrup 16 occupies the position shown in full lines in Fig. 2. These forks take into necks or grooves 32 in the rear rods 15 to insure that these rods and the stirrup 16 shall be firmly held when the vertical arms 13 slide upon the said rods, owing to the movement of the supports 3 under the action of the screw 7, as will be hereinafter explained.

The cross-pieces 12, mounted hingewise at 11 on the supports 3, are provided at about their center with bolts 25, which serve to fix the pressure-plates 26 of well-known construction.

The supports 3 (or one of them only) carry at the end opposite to the hinges 11 a lever 27, provided with a tooth 28, which by being turned on a pivot 29 can be brought into engagement with the cross-piece 12, so as to insure the connection of the latter with the support 3 and prevent any movement of the cross-pieces 12 or opening of the hinges 11 while the upper is being mounted on the last.

The machine is completed in the ordinary manner by a number of hooks 30 for the stretching-pincers, (not shown,) which are operated in the well-known manner by means of pedals 31.

The operation of the machine is as follows: The four-branched stirrup 16 being in the position shown in full lines in the drawings and being firmly fixed to the supports 3 by the engagement of the tooth 28 of the lever 27 with the arm 12, an ordinary cast-iron sole-piece is fixed on the last-support 22, on which sole-piece is placed the last 21, carrying the upper. The last is then fixed upon the support by means of the jointed rod 20, which is lowered by turning the screw-threaded rod 19. The pressure exerted upon this last by the rod 20 tends to raise the stirrup 16, but the latter is prevented from rising by the lever 27, which holds the cross-piece or cross-pieces 12 against the support or supports 3. The upper to be lasted having been placed upon the machine, the operation proceeds in the ordinary manner—that is to say, the upper is first seized by pincers attached to the hooks 30 and the necessary tension is then applied by lowering the pedals 31, which draw down the pincers. The screw 7 is then rotated by means of hand-wheels, for example, with which it is provided. The rotation of this screw displaces the supports 3 with respect to each other, and these supports carry along with them the pressure-plates 26 by means of the cross-pieces 12, which slide with their arms 13 on the four rods 15, which support the stirrup. The plates 26 in approaching each other bring the upper into contact with the insole. This operation being finished, the stretching-pincers are detached from the upper, which rests held in tension by the pressure of the plates 26. The upper is then preliminarily attached to the insole. As has been already explained, my new machine allows of this operation being effected in the same manner as by hand. For this purpose the tooth 28 is disengaged with the lever 27 from the cross-piece 12, and the stirrup 16 is turned on the hinge 11, so as to bring it into the position shown in dotted lines in Fig. 2 of the drawings. The stirrup 16 carries with it by means of the rods 15 (of which the two rear ones have now become disengaged from the forks 24) the arms 13, and consequently the cross-pieces 12 with the plates 26, which support the last from beneath, so that the latter can dispense with the last-support 22 and assume the reversed position (shown in dotted lines) without any change taking place in the relative positions of the pressure-plates, the last, and the stirrup. The upper is held in position by the plates, and the insole is freely presented to the operator, who can insert the tacks or the like in the ordinary manner by hand or by means of any suitable tool.

The improved machine hereinbefore described possesses the important advantage of allowing the preliminary joining of the upper and insole by means of tacks or sprigs in the ordinary manner, as when working by hand. It thus allows of dispensing with the delicate and generally defective method of connecting the parts by cement or the like, which has been hitherto necessary by reason of the impossibility of inserting the tacks or sprigs into the upper placed upon the last-support, which rendered the sole quite inaccessible and from which the last could not be removed before fixing without relaxing the upper.

What I claim is—

1. In a lasting-machine, a supporting-frame, a last-support carried thereby, upper-stretching devices carried by the supporting-frame, pressure-plates for holding the edges of the leather after it has been stretched and means permitting the inverting of the pressure-plates while the latter are still holding the edges of the leather, substantially as described.

2. In a lasting-machine, a supporting-frame, a last-support carried thereby, a supplemental frame hinged to said supporting-frame, upper-stretching devices carried by said supporting-frame and means carried by the supplemental frame for holding the edges of the leather after it has been stretched, said supplemental frame with the upper-holding means being capable of being inverted, substantially as described.

3. In a lasting-machine a supporting-frame, a last-support carried thereby, a supplemental frame hinged at one side to said supporting-frame, retaining means for locking the other side of the supplemental frame to the supporting-frame, holding means for holding the last on the support, stretching devices carried by the supporting-frame for stretching the upper and means carried by the supplemental frame for holding the upper when stretched, said means being adapted to be inverted with the supplemental hinged frame, substantially as described.

4. In combination, a main frame, a last-support carried thereby, sliding supports guided by said frame, cross-pieces hinged to said sliding supports, pressure-plates on said cross-pieces, means for displacing the pressure-plates with respect to each other, a device for fixing the last on the last-support, the said device being carried by the hinged cross-pieces of the sliding supports without interfering with the movement of the same and being adapted to be turned down with the said cross-pieces and pressure-plates after the stretching of the upper, substantially as and for the purpose set forth.

5. In combination, a main frame, a last-support carried thereby, sliding supports guided by said frame, cross-pieces hinged to said sliding supports, pressure-plates on said cross-pieces, means for displacing the pressure-plates with respect to each other, a stirrup for fixing the last on the last-support, the said stirrup being provided with guide-rods, vertical arms having eyes through which said guide-rods pass, said vertical arms projecting from the cross-pieces hinged to the sliding supports in such a manner that the said stirrup, the cross-pieces, and the pressure-plates may be turned down with the last after the stretching of the upper substantially as and for the purpose set forth.

6. In combination, a main frame, a last-support carried thereby, sliding supports guided by said frame, cross-pieces hinged to said sliding supports, pressure-plates on said cross-pieces, means for displacing the pressure-plates with respect to each other, a stirrup for fixing the last on the last-support, the said stirrup being provided with guide-rods, vertical arms having eyes through which said rods pass, said arms projecting from the cross-pieces hinged to the sliding supports and means adapted to hold the stirrup firmly when the sliding supports are displaced with the pressure-plates with respect to each other, substantially as and for the purpose set forth.

7. In combination, a main frame, a last-support carried thereby, sliding supports guided by said frame, cross-pieces hinged to said sliding supports, pressure-plates on said cross-pieces, hinges between the said cross-pieces and the sliding supports, means for displacing the pressure-plates with respect to each other, four vertical arms projecting from the cross-pieces hinged to the sliding supports, said arms having eyes, a stirrup for fixing the last on the last-support, the said stirrup being provided with four guide-rods passing through eyes of the vertical arms two vertical supports provided with forks in which normally rest the ends of two of the guide-rods and means for preventing any opening of the hinges while the upper is being mounted on the last, substantially as described and for the purpose set forth.

In witness whereof I have hereunto set my hand in presence of two witnesses.

CLEMENT VAN MARCKE DE LUMMEN.

Witnesses:
GREGORY PHELAN,
GEORGE BEDE.